Jan. 3, 1928.

Re. 16,842

F. H. HAMPTON

FUNNEL

Original Filed May 10, 1926

INVENTOR.
Francis H. Hampton
BY
Erwin, Wheeler & Woolard
ATTORNEYS.

Reissued Jan. 3, 1928. Re. 16,842

UNITED STATES PATENT OFFICE.

FRANCIS H. HAMPTON, OF SALT LAKE CITY, UTAH.

FUNNEL.

Original No. 1,618,531, dated February 22, 1927, Serial No. 108,108, filed May 10, 1926. Application for reissue filed November 11, 1927. Serial No. 232,695.

My present invention relates to improvements in funnels of the collapsible type and adapted for use in the performance of the functions of a siphon.

While the funnel of my invention is well adapted for use in many ways in filling receptacles with fluent material, it is particularly designed as an accessory for automobiles, and for this purpose the funnel is fashioned with a telescoping structure which may readily be collapsed into compact form for storage when not in use, and which may with equal facility be extended for use when required.

The funnel is also provided with means adapting it for use as a siphon, and a hose is utilized as part of the equipment for use in filling a gasoline supply tank of an automobile. As an emergency device, the funnel and its siphon features are capable of use in transferring a quantity of gasoline from one automobile tank to the tank of another automobile. Thus when a driver on the road finds that his supply of gasoline is exhausted, instead of being compelled to walk to the nearest gasoline station, he may borrow a temporary supply from a generous and more fortunate driver by utilizing the funnel and its equipment for siphoning a quantity of gasoline from one tank to another.

The invention consists in certain novel combinations and arrangements of parts as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1:
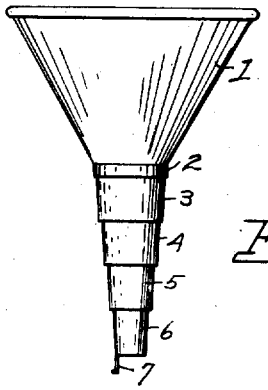
Figure 1 is a view in side elevation of a funnel embodying my invention.

The funnel is of standard shape and may be made up in standard sizes, in sectional, telescopic structure, of which 1 designates the main section of inverted, frusto-conical shape, and provided with a tapering, annular flange 2 at its lower end. Within the flange 2 the section 3 is suspended, and the succeeding sections 4, 5 and 6 of succesively smaller diameter and tapering in shape, complete the sectional, telescopic structure of the funnel. In dotted lines Figure 2 the funnel is shown in collapsed position, and a handle 7 at the lower end of the lowermost funnel 6, is grasped to pull the successive sections to the full line or extended positions of Figures 1 and 2. In collapsing the funnel the sections are successively pushed one within another in usual manner.

At approximately midway the height of the main section 1 is arranged a fixed plate 8 in the form of a circular disk, and this disk, which is preferably of metal, is fashioned with a number, as four, of radiating arms 9, each of which is attached to the section 1 by a rivet as 10 near its juncture with the disk or plate.

The arms extend upwardly and outwardly to form flaring, spring retainers, as will be described.

In the fixed plate are formed a suitable number of ports or openings with screens 11 extended across the ports for straining or filtering the gasoline or other liquid passing through the funnel, and below the fixed plate is a rotary bottom plate 12 of a diameter to freely turn within the funnel section and guided by a bolt or pin 13 which projects upwardly through an arcuate slot 14 in the fixed plate. The movable plate also has a number of ports or openings 15, complementary to the ports or screened openings 11 of the fixed plate, and it will be apparent that the movable plate may be turned to closed position to shut off passage of air through the screened ports and ingress of air to the interior of the funnel when it is being utilized as a siphon. During the ordinary use of the funnel, the screened ports 11 and ports 15 are of course made to register for the passage of the liquid therethrough. When the device is used as a siphon, however, these ports are closed by turning the bottom plate.

At the center of the double-thick partition formed by the plates 8 and 12 is fashioned a tubular boss 16, and a suitable length of hose 17 is attached thereto by the head 18, which head fits tightly over the enlargement of the boss, and permits freedom in moving the tube or hose as required.

Figure 2:
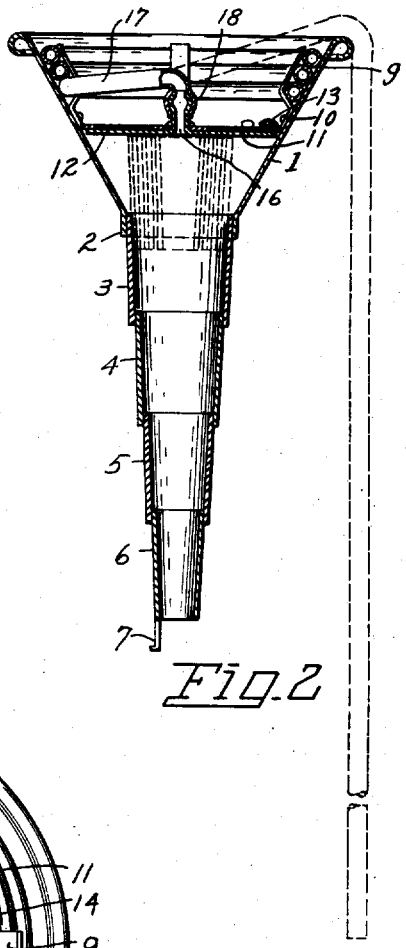
Figure 2 is a vertical sectional view of the telescoping funnel, showing its collapsed position by dotted lines, and also showing in dotted lines the extended hose or flexible tubing used when siphoning the fluent material or liquid.
Figure 3:
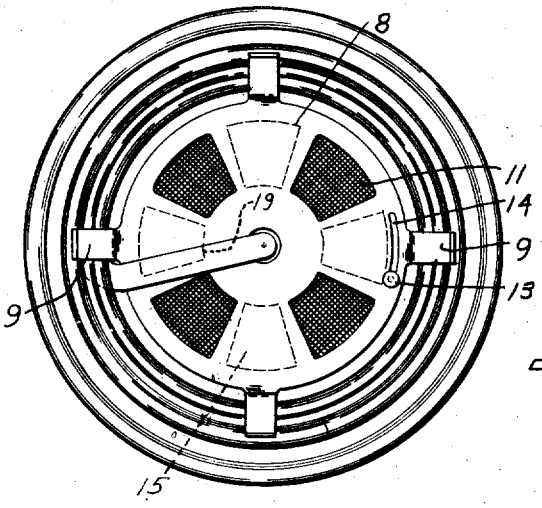
Figure 3 is a top plan view, enlarged, of the funnel, with the hose coiled in its place.

In Figure 2 the hose or tube is shown coiled around the inner face of the flaring wall of the main section, and retained in place by the resilient arms 9 of the fixed partition or strainer.

With the coils in place as shown, the funnel may be used in the ordinary manner. Any suitable means may be employed for starting the siphoning action. For example, the rubber tube may be uncoiled and its free end inserted beneath the level of the liquid in a supply tank, the spout sections extended and lowered below the level of such liquid and thereupon, with the screened ports open, liquid may be poured from a third vessel through such ports and the movable plate rotated to close the ports when there is a sufficient column in the funnel to start the siphoning action. If desired, the lower spout section may be initially closed by the finger of the operator until a siphon starting column is obtained whereupon the funnel ports may be closed and such liquid allowed to escape by removal of the finger. A third method of use is possible. Closing the funnel ports by rotation of the plate 12 enables the user to fill the upper portion of the funnel bowl, and then after adjusting the funnel to siphoning position as above described the siphon may be started by merely rotating the plate or valve 12 until its ports 15 register with those covered by the screens 11. A fourth siphon starting method is disclosed in a companion application, Serial Number 164,666, filed January 31, 1927, in which the extension of funnel spout sections is utilized to create a vacuum and start the siphon. This requires the use of modified spout sections not disclosed or claimed herein, the claims of this application being limited to the means for retaining the hose within the bowl of a folding funnel and connecting it with a ported partition of specific type in the funnel bowl.

Having thus fully described my invention, what I claim as new and desire to secure by Letters Patent is—

1. The combination with a sectional, telescopic funnel having a partition and screened ports, and means for closing the ports, of a hose attached to the partition for communication with the interior of the funnel, and means for retaining the hose in coiled position in the main section of the funnel.

2. The combination with a funnel having a partition with screened ports, and means for closing the ports, of a hose attached to the partition for communication with the interior of the funnel, and resilient retaining arms for holding the hose in coiled position above the partition.

3. The combination with a funnel having a partition and screened ports therein, and a rotatable ported closure for said screened ports, of a hose attached to the partition for communication with the interior of the funnel, resilient retaining arms on the partition for the coiled hose, and means for fastening said arms to the funnel.

4. The combination with a telescopic funnel having a partition and screened ports therein, a rotatable ported disk-closure having a guide pin for engagement with a slot in the partition, and an open boss on the partition, of a hose attached to said boss, resilient retaining arms on the partition for the coiled hose, and means for fastening said arms to the funnel.

FRANCIS H. HAMPTON.